United States Patent [19]

Segev et al.

[11] Patent Number: 5,357,759
[45] Date of Patent: Oct. 25, 1994

[54] FLUID FLOW REGULATOR

[75] Inventors: Shmuel Segev, Haifa; Ofer Glinka, Kiryat-Motzkin; Amos Arbel, Nofit, all of Israel

[73] Assignee: State of Israel - Ministry of Defence, Israel

[21] Appl. No.: 105,021

[22] Filed: Aug. 10, 1993

[30] Foreign Application Priority Data

Aug. 25, 1992 [IL] Israel .................................... 102933

[51] Int. Cl.$^5$ ............................................ F25B 19/00
[52] U.S. Cl. ...................................... 62/51.2; 251/86
[58] Field of Search ..................... 62/51.2; 251/84, 86; 236/99 R

[56] References Cited

U.S. PATENT DOCUMENTS

| 1,763,927 | 6/1930 | Ireland | 251/86 |
| 2,752,937 | 7/1956 | Hieger | 251/84 X |
| 2,890,711 | 6/1959 | Parker | 251/86 X |
| 4,002,039 | 1/1977 | Cramer et al. | 62/51.2 X |
| 4,073,469 | 2/1978 | Kodric | 251/86 |
| 4,245,783 | 1/1981 | Richter | 251/84 X |
| 4,569,210 | 2/1986 | Albagnac | 62/51.2 |
| 4,570,457 | 2/1986 | Campbell | 62/51.2 |
| 4,690,323 | 9/1987 | Morgan | 251/86 X |

OTHER PUBLICATIONS

*Miniature Refrigerators for Cryogenic Sensors and Cold Electronics*, Graham Walker (Clarendon Press–Oxford 1989).

*Primary Examiner*—William E. Tapolcai
*Attorney, Agent, or Firm*—Morgan & Finnegan

[57] ABSTRACT

The present invention relates to a particular needle-orifice fluid flow regulator to be used in a cryocooler. The flow regulator comprises a fluid outlet port adapted to receive therethrough a pressurized cooling fluid via a conduit. The needle is arranged for variable positioning relative to said outlet and temperature responsive needle positioning means for positioning said needle relative to said port as a function of temperature, whereby the needle is floatingly mounted relative to said needle positioning means. The positioning means is adapted to apply displacement forces to the needle along an axis which extends through said fluid outlet port, being constructed in a manner which enables to maintain the needle substantially coaxial with the outlet port. The fluid outlet port has a funnel shaped portion with a relatively narrow end arranged for fluid communication with said conduit configured to engage and guide the needle into mating engagement with the fluid outlet port.

13 Claims, 4 Drawing Sheets

FLUID FLOW REGULATOR

The present invention relates to fluid flow regulators. More particularly, the invention relates to needle-orifice fluid flow regulators to be most useful in cryocooler.

BACKGROUND OF THE INVENTION

Needle-orifice flow regulators are well known in the art. They are used for accurate valves of gases and liquids and particularly for small amounts. One particular use thereof is in Joule-Thomson crycooler. A description of cryocoolers is given in the Chapter 2 (pages 12–46) of Miniature Refrigerators for Cryogenic Sensors and Cold Electronics, GRAHAM WALKER (Clarendon Press-Oxford 1989). Conventional Joule-Thomson cryocoolers typically include a conduit receiving pressurized cooling fluid and a cooling fluid outlet nozzle. These cryocoolers also include a regulator for governing the rate of cooling fluid escape from the conduit via the outlet nozzle. The regulator includes a needle which is arranged for a variable position relative to the outlet nozzle and a temperature responsive apparatus to which the needle is attached for positioning the needle relative to the nozzle as a function of temperature. After an initial cool down stage, steady state flow regulation is provided by very slight movements of the needle which require only application thereto of very small forces. When the needle is attached to the positioning apparatus, even a slight distortion in the regulator, or any frictional resistance to movement of the needle by the outlet nozzle causes a lack of repeatability of conventional Joule-Thomson cryocoolers both in manufacture and in operation. As a result, they suffer from considerably lower gas utilization efficiency than could be expected from an ideally regulated cooler, and their operating specifications call for replacement at time intervals which are much shorter than desirable.

SUMMARY OF THE INVENTION

The present invention seeks to provide an improved needle-orifice fluid flow regulator which overcomes disadvantages of the prior art.

The present invention further seeks to provide an improved cryocooler which overcomes disadvantages of the prior art.

There is provided, therefore, in accordance with a preferred embodiment of the invention, a needle-orifice fluid flow regulator which includes a fluid outlet port adapted to receive therethrough a fluid flow; a needle arranged for variable positioning relative to the outlet port; and temperature responsive needle positioning apparatus for positioning the needle relative to the port as a function of temperature, characterized in that the needle is floatingly mounted relative to the needle positioning apparatus.

According to an additional preferred embodiment of the invention, there is provided a cryocooler which includes a conduit for receiving a pressurized cooling fluid and defining a fluid outlet port; and a fluid flow regulator for regulating the rate of fluid escape from the conduit via the outlet port.

The fluid flow regulator includes a needle arranged for variable positioning relative to the outlet port; and temperature responsive needle positioning apparatus for positioning the needle relative to the port as a function of temperature, characterized in that the needle is floatingly mounted relative to the needle positioning apparatus.

Additionally in accordance with a preferred embodiment of the invention, the positioning apparatus is adapted to apply displacement forces to the needle along an axis extending through the fluid outlet port, the needle positioning apparatus being constructed such that the needle is maintained generally coaxial with the outlet port.

Further in accordance with a preferred embodiment of the invention, the fluid outlet port is configured so as to guide the needle into mating engagement therewith.

BRIEF DESCRIPTION OF THE DRAWINGS

The present invention will be more fully appreciated and understood from the following detailed description, taken in conjunction with the drawings in which.

DETAILED DESCRIPTION OF A PREFERRED EMBODIMENT

Figure 1A:
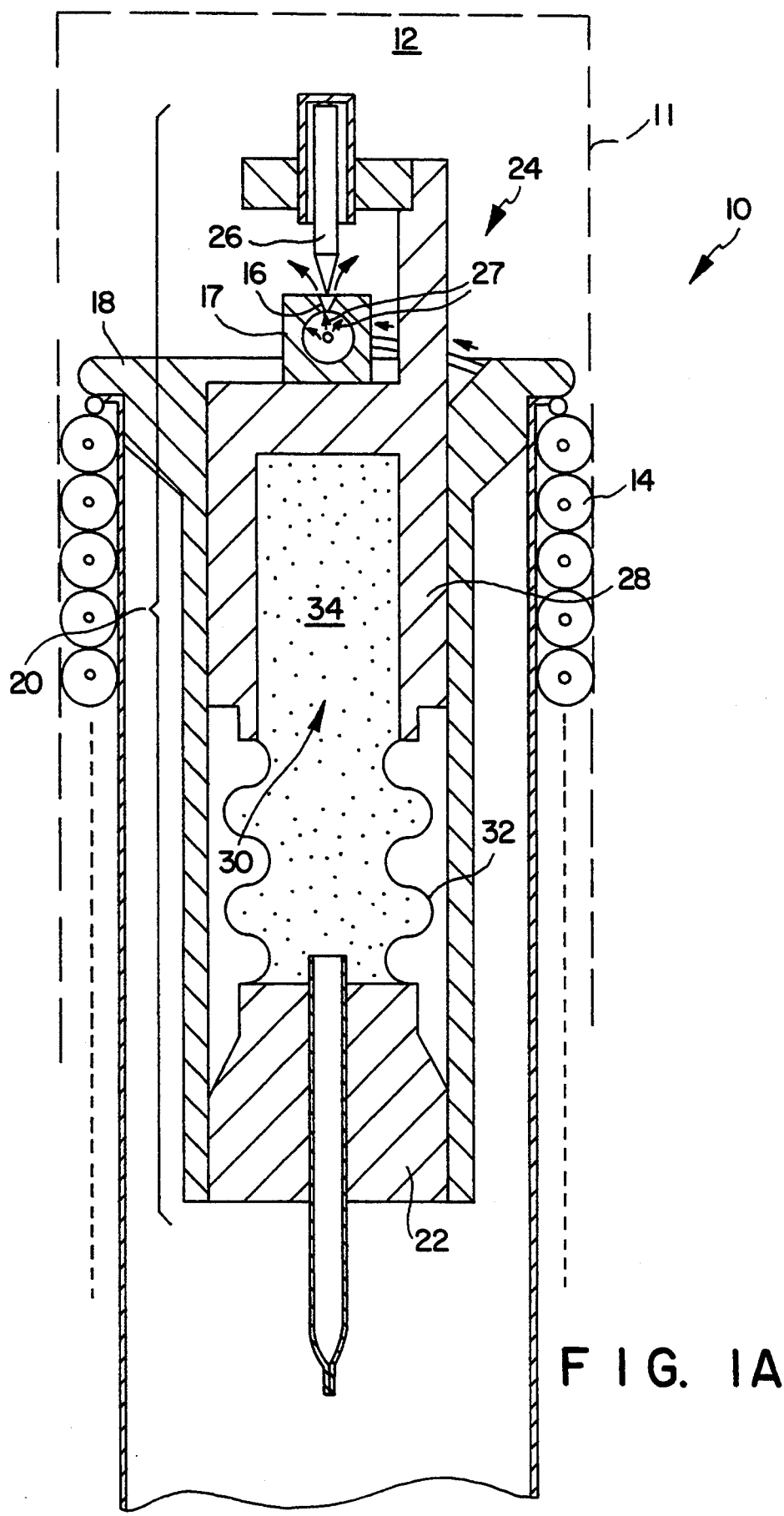
FIGS. 1A and 1B are schematic sectional views of a needle-orifice fluid flow regulator constructed and operative in accordance with a preferred embodiment of the invention in respective first and second extreme operative orientations.
Figure 1B:
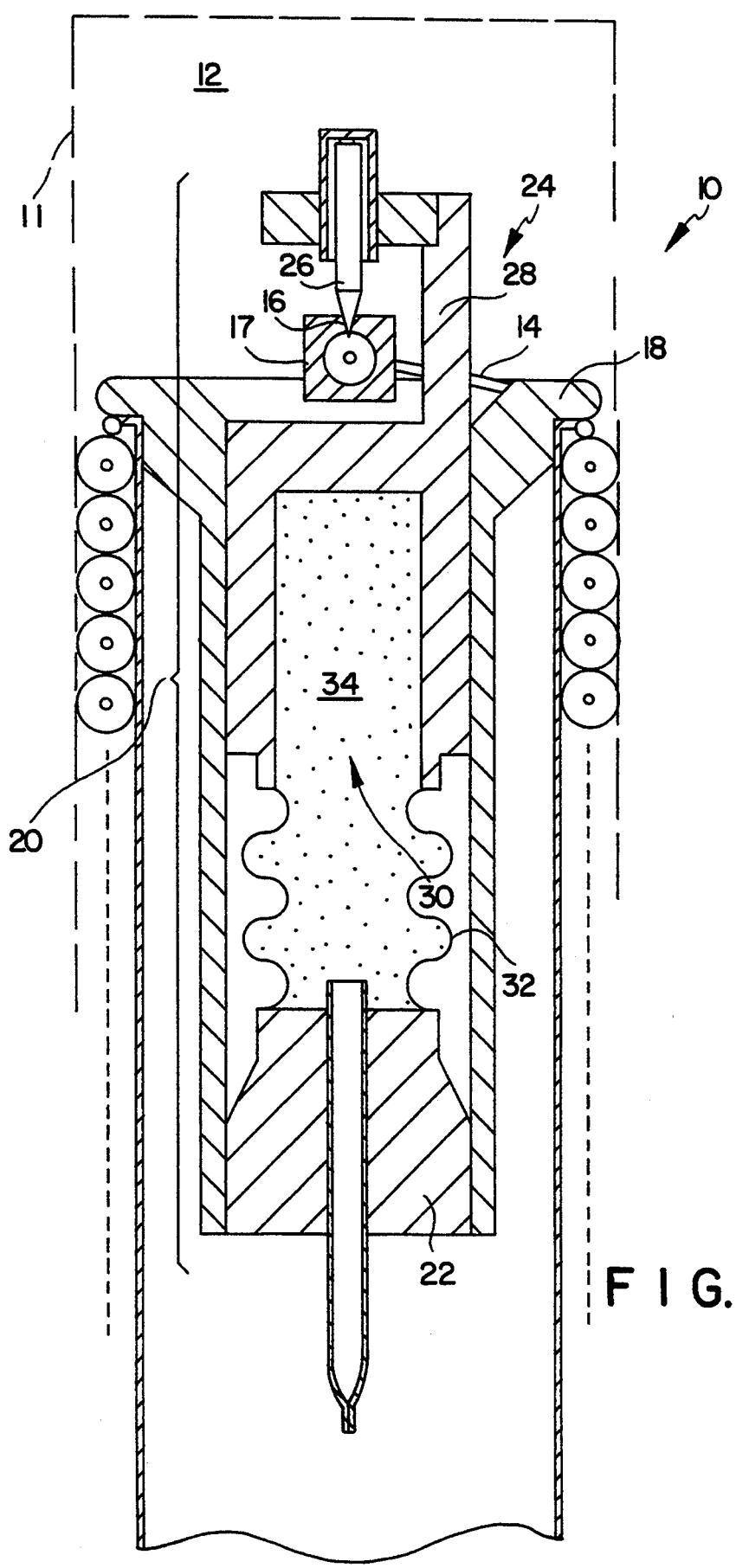
Figure 3:
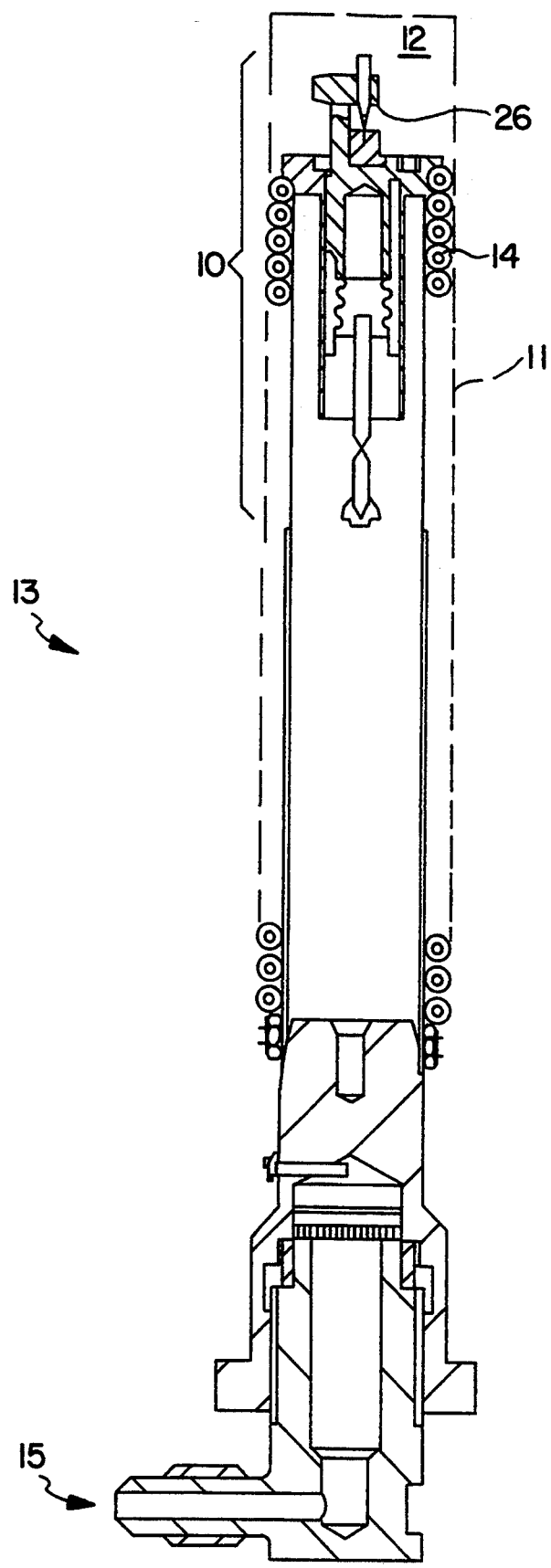
FIG. 3 is a schematic illustration of a Joule-Thomson cryocooler employing the fluid flow regulator of the present invention.

Reference is now made to FIGS. 1A and 1B, in which is shown a needle-orifice fluid flow regulator, referenced generally 10, constructed and operative in accordance with a preferred embodiment of the invention, in respective first and second extreme operative orientations. In the present non-limiting example, regulator 10 is the fluid flow regulator such as used in a cryocooler, referenced generally 13 (FIG. 3) and as typically mounted in a dewar sleeve, indicated schematically at 11. A cooling fluid inlet port is indicated generally at 15 (FIG. 3). Typically, cryocooler 13 is of the Joule-Thomson type.

It will be appreciated, however, that regulator 10 is intended for use in any appropriate fluid flow system.

In the first extreme operative orientation, regulator 10 is operative to permit cooling of a space 12 inside the dewar sleeve 11 at a maximum rate. In the second extreme operative orientation, regulator 10 permits no cooling of space 12. Maximum rate cooling is normally provided when it is sought to initially cool space 12 to a preselected temperature. Cooling at a rate less than the maximum rate, in which regulator 10 is in an orientation between the illustrated first and second extreme orientation, may be required after initial cool down of space 12 has been provided, and when it is thus sought to maintain space 12 at a preselected steady-state temperature.

Referring now also to FIG. 3, cryocooler 13 also includes a conduit 14 for receiving a pressurized cooling fluid, such as nitrogen, argon or air. Conduit 14 is typically formed as a finned tube heat exchanger and defines an outlet port 16 which is preferably defined by a nozzle 17 attached to a body 18 of the regulator 10. Body 18, as schematically illustrated, defines a generally cylindrical space in which is located temperature responsive apparatus 20 for governing the rate of escape of fluid from the outlet port 16.

Apparatus 20 includes an anchor member 22 which is fixedly attached to body 18, and a cooling fluid escape regulation assembly 24. Assembly 24 includes a needle 26 arranged for variable positioning relative to the outlet port 16, and a positioning member 28 that is slidably mounted within body 18. Positioning member 28 has a cylindrical configuration and has an open end 30 which is attached via a bellows 32 to anchor member 22.

Bellows 32 is attached to both positioning member 28 and anchor member 22 in any suitable, conventional manner so as to be sealed thereto, thereby to define therewith a sealed space 34 containing a gas having a known coefficient of expansion. At an initial, relatively warm temperature, the gas in sealed space 34 occupies a relatively large volume, such that positioning member 28 is in a generally raised position relative to outlet port 16, as shown in FIG. 1A.

Figure 2A:
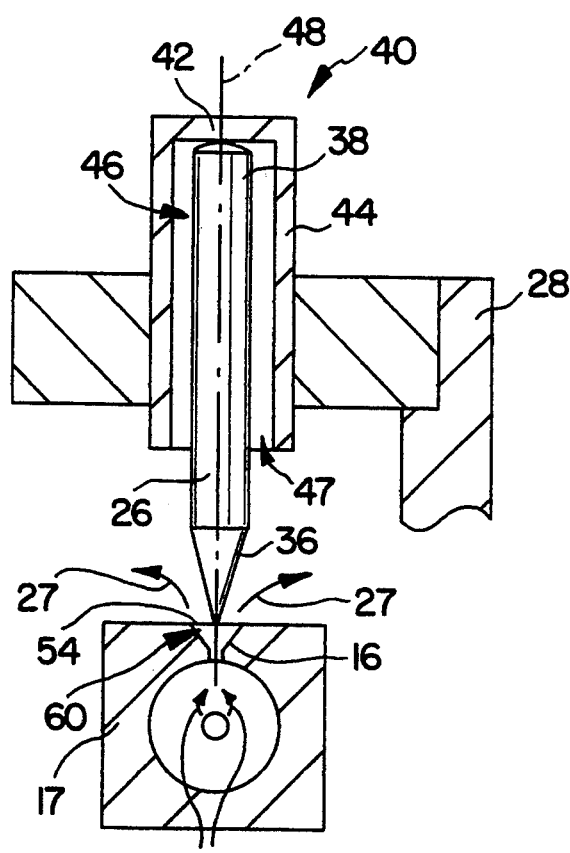
FIGS. 2A and 2B are enlarged illustrations of the positioning of the needle relative to the outlet port in the first and second orientations shown in FIGS. 1A and 1B respectively.

Due to the pressure of the cooling fluid, when member 28 is in the illustrated relatively raised position, needle 26 is maintained in a generally floating, non-engaged position, as shown in FIGS. 1A and 2A. The resultant outward flow of the cooling fluid is indicated by arrows 27 (FIGS. 1A and 2A).

As the temperature of space 12 falls to a preselected temperature, the body 13 and the gas contained inside sealed space 34 also cool at a known rate. As the gas in sealed space 34 cools, it contracts so as to apply a net negative force to positioning member 28. Positioning member 28 is thus slidably displaced towards anchor member 22, so as to cause a corresponding axial displacement of needle 26 into mating engagement with outlet port 16. Full mating engagement of needle 26 and outlet port 16 is shown in FIGS. 1B and 2B.

In the illustrated, fully closed position, needle 26 is maintained under a predetermined closure force which is sufficient to overcome the pressure of the cooling fluid which seeks to exit through outlet port 16. Maintenance of this closure force on needle 26 causes a full closure of port 16, thereby to prevent escape therethrough of the cooling fluid.

Figure 2B:
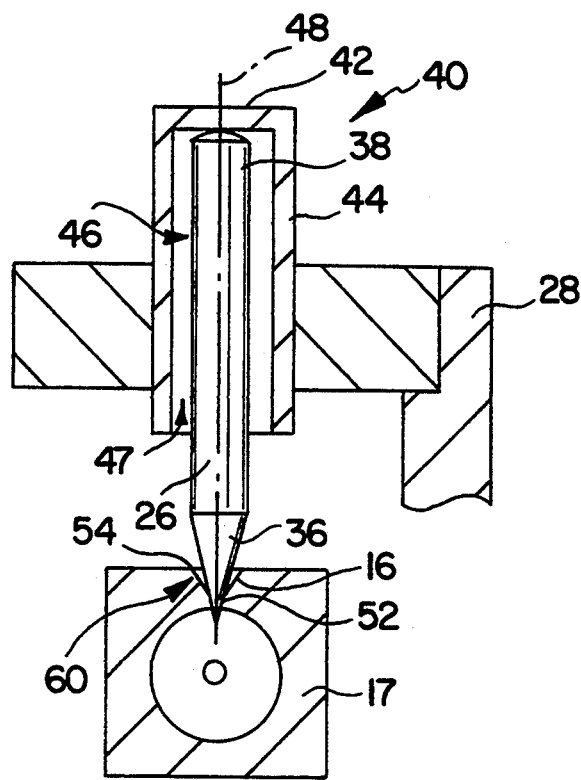

Referring now particularly to FIGS. 2A and 2B, needle 26 has a first, generally conical, pointed end 36 configured for mating engagement with outlet port 16, and a second end 38 configured to be engaged by positioning member 28. Positioning member 28 has a needle engagement portion 40 which is adapted to non-retentively engage second end 38 of needle 26 so as to apply an axial displacement force thereto. Preferably, second end 38 of needle 26 is rounded.

In the present embodiment, needle engagement portion 40 has a sleeve-like configuration, having a closed end portion 42 arranged to non-retentively engage the second end 38 of the needle 26, and further having a generally cylindrical wall portion 44 which extends transversely from the closed end portion 42. Wall portion 44 is configured to surround a portion 46 of the needle 26 adjacent to its second end 38. The internal diameter of wall portion 44 is greater than the external diameter of needle portion 46, such that a generally annular space 47 exists between the wall portion 44 and the needle 26. It will thus be appreciated that needle engagement portion 40 while not retentively engaging needle 26, effectively confines it to the interior, cylindrical volume defined by portion 40.

According to a preferred embodiment, therefore, as the gas contained within space 34 (FIGS. 1A and 1B) cools, thereby contracting and thus causing a retraction of positioning element 28, positioning element 28 is operative to displace needle 26 primarily along an axis 48 extending through outlet port 16. Due to the nonretentive nature of the engagement between needle 26 and positioning member 28, a certain amount of lateral movement of needle 26 may occur. This lateral movement allows self-centering of needle 26 inside outlet port 16, thus compensating for any inaccuracies and/or distortions in regulator 10.

In order to ensure that needle 26 is oriented substantially along axis 48 as it engages outlet port 16, thereby ensuring substantial repeatability of the system, port 16 is provided with an entry portion 50 that is configured so as to guide and straighten needle 26 as it enters into mating engagement with outlet port 16. Preferably, entry portion 50 has a funnel configuration which has a relatively narrow neck portion 52 arranged for fluid communication with the conduit 14, and a relatively wide open end 54.

Open end 54 is configured to engage and guide the pointed end 36 of needle 26 into sealing engagement with neck portion 52 as regulator 10 moves from the first extreme operative orientation illustrated in FIG. 1A to the second extreme operative orientation illustrated in FIG. 1B. In the second extreme orientation of regulator 10, pointed end 36 of needle 26 engages neck portion 52 so as to define a fluid impermeable seal therewith, as illustrated in FIG. 2B.

It will be appreciated by persons skilled in the art that the invention is not limited by what has been particularly shown and described hereinabove. Rather, the scope of the present invention is defined only by the claims which follow:

We claim:

1. A needle-orifice fluid flow regulator which comprises:
   a fluid outlet port adapted to receive therethrough a fluid flow;
   a needle arranged for variable positioning relative to said outlet, and
   a temperature-responsive needle positioning means for positioning said needle relative to said port as a function of temperature, being characterized that said needle is floatingly mounted relative to said needle positioning means.

2. The fluid flow regulator according to claim 1, wherein said positioning means is adapted to apply displacement forces to said needle along an axis extending through said fluid outlet port, wherein said needle positioning means is constructed such that said needle is maintained substantially coaxial with said outlet port.

3. The fluid flow regulator according to claim 2, wherein said fluid outlet port is configured so as to guide said needle into mating engagement therewith.

4. The fluid flow regulator according to claim 3, wherein said fluid outlet port has a funnel shaped portion which has a relatively narrow end arranged for fluid communication with said conduit and a relatively wide and open end configured to engage and guide said needle into mating engagement with said fluid outlet port.

5. The fluid flow regulator according to claim 4, wherein said needle has a first end configured for mating engagement with said fluid outlet port and a second end, and said needle positioning means comprises a needle engagement portion which is adapted to move along said axis so as to displace said needle, and which comprises a sleeve element arranged to confine said second end of said needle in a cylindrical space defined by said sleeve element.

6. The fluid flow regulator according to claim 5, wherein said sleeve elements comprises:
- a closed end portion arranged to non-retentively engage said first end of said needle, and
- a substantially cylindrical wall portion extending transversely from said closed end portion so as to surround a portion of said needle adjacent to said second end thereof, said wall portion having an internal diameter greater than the diameter of said needle portion adjacent said second end thereof, thereby to define an annular space between said wall portion and said needle.

7. The fluid flow regulator according to claim 1, wherein said regulator is adapted for use with a cryocooler, said fluid outlet port being adapted to receive a flow of a pressurized cooling fluid via a conduit.

8. A cryocooler which comprises:
- a conduit for receiving a pressurized cooling fluid and defining a fluid outlet port, and
- means for regulating the rate of fluid escape from said conduit via said outlet port, which includes:
  - a needle arranged for variable positioning relative to said outlet port, and
  - a temperature responsive needle positioning means for positioning said needle relative to said port as a function of temperature, being characterized that said needle is floatingly mounted relative to said needle positioning means.

9. The cryocooler according to claim 8, wherein said positioning means is adapted to apply displacement forces to said needle along an axis extending through said fluid outlet port, and wherein said needle is maintained substantially coaxial with said outlet port.

10. The cryocooler according to claim 9, wherein said fluid outlet is configured so as to guide said needle into mating engagement therewith.

11. The cryocooler according to claim 10, wherein said fluid outlet port has a funnel shaped portion which has a relatively narrow end arranged for fluid communication with said conduit and a relatively wide, open end configured to engage and guide said needle into mating engagement with said fluid outlet port.

12. The cryocooler according to claim 10, wherein said needle has a first end configured for mating engagement with said fluid outlet port and a second end, and said needle positioning means comprises a needle engagement portion which is adapted to move along said axis so as to displace said needle, and which comprises a sleeve element arranged to confine said second end of said needle in a cylindrical space defined by said sleeve element.

13. The cryocooler according to claim 12, wherein said sleeve element includes:
- a closed end portion arranged to non-retentively engage said first end of said needle, and
- a substantially cylindrical wall portion extending transversely from said closed end portion so as to surround a portion of said needle adjacent to said second end thereof, said wall portion having an internal diameter greater than the diameter of said needle portion adjacent to said second end thereof, thereby defining an annular space between said wall portion and said needle.

* * * * *